United States Patent Office 3,043,717
Patented July 10, 1962

3,043,717
HYDROPHOBIC SHEET MATERIAL AND
METHOD OF MAKING THE SAME
Walter M. Budde, Jr., Minneapolis, Minn., assignor to
Archer-Daniels-Midland Company, Hennepin County,
Minn., a corporation of Delaware
No Drawing. Filed Nov. 17, 1958, Ser. No. 774,088
15 Claims. (Cl. 117—138.8)

This invention relates to improved moisture resistant and essentially water and vapor proof laminations of flexible sheet materials and primarily polyvinyl alcohol film material having an organic film forming polyester chemically and intermolecularly bonded thereto, and includes the process of obtaining the same. More particularly, the invention relates to providing the art with improved water and moisture resistant polyvinyl alcohol films and the process of providing an in-situ polymerization therewith of a co-polymeric polyester film former produced of selective epoxy and polyepoxide (or oxirane compounds) having internal oxirane groups and obtained by epoxiding long chain polyhydric alcohol esters of fatty acids, fatty oils and derivatives thereof, which are obtained from vegetable, animal and marine sources, including mixtures thereof, under film forming reactive conditions with strong polybasic anhydrides. This application is a continuation-in-part of my copending application for "Protective Film Forming Composition and Resultant Films," Serial No. 709,791 and further reference is made to the copending application for "Resins and Method of Making the Same," Serial No. 762,805, now U.S. Patent No. 2,993,920, in which I am co-inventor.

It is known that vinyl chloride, either alone or in conjunction with co-monomers, and polymerization catalysts, for free-radical type polymerizations, has been used to modify polyvinyl alcohol. Methods for this type generally involve emulsion polymerization techniques followed by film coating or fiber extrusion (J. R. Caldwell-Eastman Kodak—U.S. 2,843,562). A further insolubilization technique involves a formaldehyde treatment to give the formal structure. ("Fibres, Plastics and Rubbers," W. J. Roff, Academic Press, New York, 1956, pp. 163, 168).

However, polyvinyl alcohol films are still known to be highly permeable to water and moisture vapor transmission. This is a shortcoming that has prevented the use of such films in those areas of the packaging and protective sheeting fields when water resistance is important and critical. For example, in the food packaging field for deep freeze, polyvinyl alcohol films are economical but they do not prevent dehydration of the food at low temperatures or afford adequate protection against moisture under storage conditions of high humidity. Normal surface coatings, such as alkyd resins and the like systems are in themselves ineffective due to insufficient adhesion. Otherwise, it has been necessary to use a two layer system with an intermediate adhesive between the polyvinyl alcohol film and a lacquer layer. Thus, it will be recognized that there is a need and desire for economically feasible and improved polyvinyl alcohol films which are flexible, for wrapping and packaging, and resistant to moisture and moisture vapor.

Accordingly, it is an object of this invention to provide flexible polyvinyl alcohol sheet materials chemically and intermolecularly united with dry, non-tacky, flexible films of long chain fatty oil base coating materials resistant to moisture and the transmission of moisture vapor, such coated sheet materials being particularly useful for wrapping and packaging goods, subject to damage by loss of, and exposure to, moisture.

Another object of this invention is to provide improved flexible polyvinyl alcohol film and sheet materials with flexible water proof coatings of long chain fatty oils and ester derivatives thereof chemically and intermolecularly bonded to the polyvinyl sheet and the method of providing such improved polyvinyl sheet materials from epoxidized long chain fatty esters, faty oils and derivatives thereof.

A further object of this invention is to provide flexible polyvinyl alcohol films having chemically and intermolecularly bonding thereto, waterproofing polyester coatings of flexible film forming fatty oils, long chain fatty esters and similar materials derived from long chain fatty acids and mixtures thereof, and the method of producing the same with a strong acid anhydride.

To the accomplishment of the foregoing and related ends, this invention and improvement then comprises the features as above and hereinafter more fully described and particularly pointed out in the claims. The following description sets forth details of certain illustrative embodiments of the improvement, these being indicative, however, of but a few of the various ways in which the principle of the improvement may be made.

Essentially, this improvement concerns my discovery that the detrimental water and moisture vapor permeable characteristics of flexible polyvinyl alcohol packaging and sheet materials can be changed and the film material rendered impermeable to water and moisture vapor by chemically and intermolecularly bonding thereto a polyester derived from a film forming epoxy material.

The film forming epoxy materials when added in various solvent systems, for a chemical and intermolecular combination, improves the surface characteristics of polyvinyl alcohol. These epoxide systems are preferably derived from the drying and semi-drying oils known to the oil and paint industry. However, after treatment by any of the various epoxidation techniques known, the above mentioned oils no longer show the drying characteristics of the base oils and are totally different in both type and mode of reaction due to the presence of internal oxirane rings as depicted in the following formula:

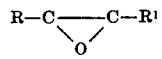

FIG. 1

R and $R^1$ represent the remaining portions of an oil molecule. To further differentiate the epoxidized oils from their unsaturated precursors the following differences exist wherein the oil before epoxidation will air dry it will not form a plastic film through action of anhydrides or acids. Conversely, the epoxidized oil will not air dry by itself or in combination with conventional paint "dryers" but, under proper conditions, will form a tough, resilient, usable plastic film by action of anhydrides or polybasic acids.

Normal coating systems rely on the intermolecular forces of adjacent polar groups of the polyvinyl alcohol and the coating system for their adherence. The new system, herein disclosed, relies on chemical bonding along with the conventional intermolecular polar forces to account for superior adhesion. Along with the superior adhesion necessary, other factors enter in, such as coating flexibility, resistance to abrasion and low permeability to water vapor. The system disclosed herein combines the qualities of polyvinyl alcohol film and the low moisture permeability of the epoxidized oil-anhydride coating system to give a product of wide versatility coupled with ease of production of the final packaging film.

It has been shown in the copending application Serial No. 709,791 of Budde, that excellent coating compositions can be formulated using a system of epoxidized oils and poly basic acids in various solvent systems. These coatings are noted for excellent adherence to wood, metal, plastics and all types of substrates normally coated with a protective system and furthermore show superior resistance to water, alkali, abrasion, etc. as disclosed in the above mentioned application. The coating disclosed herein, although inferior to the above mentioned invention for most surface coatings, surprisingly showed greater adhesion to polyvinyl alcohol with retention of high flexibility and in addition made the polyvinyl sheet material impermeable to water and moisture vapor. The epoxidized oil-polyacid system is a polymerization type as disclosed, in which the oxirane groups react with the acid groups to form ester linkages to yield the above mentioned polyester coating. In the system herein disclosed an additional reaction occurs whereby hydroxyl groups on the surface of the polyvinyl alcohol film react with the anhydride to form the half-ester of the acid which then reacts with the oxirane ring of the epoxidized oil to form the full ester and chemically binds the resulting polymeric system formed through the oil and anhydride to the surface of the polyvinyl alcohol film. This system results in a graft-polymerization type system where the growing polymer chains formed from epoxidized oil and anhydride are intermittently chemically bonded to the polyvinyl alcohol film substrate through the cross-linking mechanism noted.

The preferred and most suitable epoxidized fatty acid esters and fatty oil esters applicable for water proofing plastic polyvinyl alcohol material are those derived from unsaturated glyceryl esters obtained from animal, vegetable and marine oils whose acyl radical contains 12–26 carbon atoms of which typical examples are peanut, cottonseed, corn, soybean, safflower, walnut, rapeseed, castor, linseed, perilla, menhaden, sardine, cod, pilchard, shark, whale, sperm, tallow and lard, or derived mixtures of any of these compounds. Also included are glycerol and other polyhydric alcohol esters obtained by esterification of tall oil and other unsaturated long chain aliphatic acids. For example, polyhydric alcohols such as pentaerythritol, trimethylolethane, ethylene glycol, triethylene glycol, and the like may be utilized for esterification of the tall oil and other long chain aliphatic acids. The necessity for efficient cross-linking is to have an iodine value in the base oil material of at least 90 prior to epoxidation.

The principal cross-linking agent must be the anhydride of an acid of pH value of 2–5 in aqueous solution. For example such agents as 3,4,5,6,7,7-hexachloro-3,6-endomethylene - 1,2,3,6 - tetrahydrophthalic anhydride (HET) and dichlorophthalic anhydride (DCPA), and mixtures of the same are preferred and exemplary. Anhydrides of lesser strength than above, when used alone are inferior and less desirable due to too long dry-time and obtain less adhesion. The lesser strength anhydrides when mixed with strong polybasic acids, having a pH value of 2–5, have a somewhat better adhesion and the drying time is lessened.

As indicated in copending application Serial No. 762,805, other and additional less preferable anhydrides derived from polybasic acids may be utilized alone or in combination with other polybasic acids. The acids and anhydrides may be saturated or unsaturated aliphatic, aromatic, heterocyclic, and cycloaliphatic, and these may be either intermolecular or intramolecular or mixed acids and anhydrides. Illustrative examples of the acids and anhydrides are those of the character of maleic, chloromaleic, succinic, citraconic, and alkyl and alkenyl substituted succinic anhydrides. Typical of the latter are octyl, dodecyl, octenyl, dodecenyl, and octadecenyl groups. Other acids and anhydrides are of the character of polyadipic, polyterephthalic, polyazelaic, polysebasic, and polyisosebasic. The aromatic anhydrides may be pyromellitic di-anhydride, phthalic, and variously substituted phthalic anhydrides such as mono-, di- and tri-chlorophthalic anhydrides. Cycloaliphatic anhydrides include compounds such as tetra- and hexahydrophthalic anhydride and other cyclic and substituted cyclic anhydrides. Diene synthesized anhydrides may also be used such as bicyclo-(2,2,1)-hept-5-ene 2,3-dicarboxylic acid anhydride and methylated and otherwise substituted derivatives; 3,4,5,6, 7,7-hexachloro-3,6-endomethylene - 1,2,3,6 - tetrahydrophthalic anhydride; and maleic anhydride Diels Alder adducts derived from compounds such as eleostearic-acid-esters, and succinic acid anhydrides derived by reacting maleic anhydride with non-conjugated unsaturated fatty acids and their esters, and the like.

As indicated, the preferred chemically formed polyester coating film is intermolecularly and chemically bonded to the polyvinyl alcohol film by a selected strong polybasic anhydride, as described. The polyesters so formed may be utilized, to form in-situ as a bond, to laminate a plurality of polyvinyl alcohol films and/or with other and hydrophilic films. Other and modified laminated plastic film structures may be bonded at their interface with the herein described materials, applied in a fluid state and set up by the application of heat, or prefabricated as a self-supporting film and laminated, as on layers by heat and pressure, if desired. In laminating two or more polyvinyl alcohol films the bond is preferably intermolecularly formed, as described, and also preferably applied to an outside or exterior surface of the polyvinyl alcohol film to render it highly resistant to water and moisture vapor. The coatings may be sprayed, brushed or calendered to the film materials.

In preparing the anhydride solvent mixture it has been found to be desirable to reduce crystallization of any excessive pure anhydride by the addition of a polybasic acid. The polybasic acid may be any of those of the character described herein and utilized interchangeably with one or more of the anhydrides as herein described. Preferably, for such mixtures, as hereinafter exemplified, the dibasic acid and its anhydride are utilized in combination for coating purposes. In addition, another modified use, for example, is one wherein the preferred polyester coating may be utilized to waterproof containers by application of the film forming epoxidized oil to the interior and external walls of molded polyvinyl alcohol and similar plastic and molded cellulosic material. The polyesters are formed with the internal oxirane oil base compounds, as described, and do not adhere to polyethylene samples. In a less preferable modification of a polyvinyl alcohol sheet material, an "Epon" material (bis-phenol epichlorohydrin condensate) and dibasic acid or anhydride thereof polyester film may be formed by an in-situ reaction of the external oxirane compound and dibasic anhydride or acid. However, it has been found that these formed polyester films, while adhesive are not continuous on the polyvinyl alcohol films and accordingly are not preferred for the purpose of rendering the polyvinyl alcohol material impervious to water and water vapor. The herein preferred polyester coatings are not considered or known as epoxy resins, as such, but are epoxidized long chain fatty acid derived polyesters, or epoxidized oil derived polyesters.

Less preferably vinyl films and polyester films may be laminated by an in-situ reaction of an epoxy oil base material and a strong polybasic acid, as the reaction products described in my copending application Serial No. 709,791. It is preferred however, in utilizing the acid, to modify the acid material with a strong anhydride for obtaining an intermolecular bonding by the in-situ polyester film formation. Illustrative, of the strong polybasic acids are chlorendic, tetrachlorophthalic, mono-chlorophthalic, maleic or fumaric acid adducts of rosin, mono-chlorophthalic acid, a maleic or fumaric acid adduct or rosin, the maleic or fumaric adduct of an unsaturated oil or fatty acid, hexachlorocyclopentadiene-furan-maleic adduct, and polybasic polymers of acrylic acid or methacrylic acid and copolymers of either with styrene, vinyl toluene, vinyl acetate, and/or acrylonitrile. The pH strength of the acidic ingredient in water at concentration of 1% or more should be no higher than about 4.7 preferably less, and about 4.5. The molecular weight of the acid should be at least 180 with two or more reactive carboxyl groups.

In general, the application of the epoxidized oils and oil derivatives to polyvinyl alcohol film material is preferably with an in-situ anhydride cross-linking material to form a polyester film intermolecularly bonded to the vinyl film, in the manner described. The addition of the acid is preferably to solubilize the anhydride, as herein described, forming solvent solutions for application of polyester coatings, not only to the polyvinyl alcohol films but other flexible and plastic films, known to the art, or polyvinylpyrrolidone, cellulosic and like films and sheeted materials, as may be desired.

Solvents acceptable for the epoxidized oil-anhydride system, are any of those in which the reactant components are mutually soluble and which do not react with the other components of the system. Examples are aceton, xylene, toluene, diethyl carbitol, Cellosolve acetate, methyl ethyl ketone, methyl isobutyl ketone, and the like. The only limitation on the solvent system is non-reactivity with other components of the mixtures.

In addition conventional pigments, ultra violet light absorbers, fungicides and bactericides may be included as additives, if desired.

The epoxidized oil anhydride film coating system necessitates heat to bring about effective cure. Catalysts of the amine type generally speed up the reaction but discolor the resultant cured coating. The temperature necessary is in the order of 150° F.–300° F. At lower temperature the cure is too slow and higher temperatures are not necessary and cause slight darkening of the coating. No special activators are necessary. In the copending application mentioned herein, major importance is placed on Sward Rocker hardness data with special note of the decreased hardness for anhydride systems. In this application the hardness, due to the specialized nature of the particular application, as a coating for polyvinyl alcohol film packaging material, is not as important, however sufficient hardness is attained due to the additional reaction of the anhydride with the surface of the film. Flexibility is very important here due to the need for retention of the flexibility of the substrate and no cleavage or tearing of the surface is noted on repeated creasing of the coated film. The copending application discloses an acceptable film for all types substrates, including polyvinyl alcohol film. However, improved adhesion of the polyester thereto is obtained by the preferred systems utilizing anhydrides, as hereinafter illustrated by showing the use of an epoxidized long chain fatty ester or glyceride oil material, as defined, and as exemplified by the preferred epoxidized soybean and linseed oil materials, as follows:

EXAMPLE I

*Epoxidized Soybean Oil With 3,4,5,6,7,7-Hexachloro-3,6-Endomethylene - 1,2,3,6-Tetrahydrophthalic Anhydride (HET) and Comparison With a Control Using The Corresponding Acid*

An epoxidized soybean oil having 6.3% oxirane oxygen was mixed with the amounts of anhydride and acid respectively as noted in Table 1 to which was added that amount of cellosolve acetate to achieve a solution of 50% solids followed by heating slightly and until clear, on a steam bath. The solutions achieved remain clear at room temperature and may be stored indefinitely in a deep freeze to increase the pot life over the normal pot life or about one day for the acid mixes and about three days for the anhydride mixes under normal temperature conditions. For the purpose of evaluation 1.5 mil drawdowns were prepared on commercial polyvinyl alcohol film of 5 mil thickness (Dupont "Elvanol" film) and cured for 20 minutes at 200° F. in a forced air oven. The dried films were aged overnight and comparative values of adhesion were obtained by observing the relative ease of lifting the film from the substrate using a sharp knife. These are classified simply as E (impossible to remove without tearing substrate), V.G. (very good but inferior to E), G. (acceptable coating but not superior as other classifications), F. (fair) and P. (very easily lifted).

TABLE 1

| Code | Parts Epoxy Oil | Parts Anhydride | Parts Acid | Mole Ratio [1] | Comparative Adhesive Nature |
|---|---|---|---|---|---|
| A | 20 | 13 |  | 0.89 | P. |
| B | 20 | 15 |  | 1.03 | E. |
| C | 20 | 17 |  | 1.17 | F. |
| D | 20 | 20 |  | 1.37 | G. |
| E | 20 |  | 13 | 0.85 | G. |
| F | 20 |  | 15 | 0.98 | V.G. |
| G | 20 |  | 17 | 1.11 | P. |
| H | 20 |  | 20 | 1.30 | P. |

[1] For acid=moles acid per mole epoxy; for anhydride=2X moles anhydride per mole epoxy.

All of the above with the exception of A also gave good adhesion to glass. No great differentiation is shown in adhesion to glass using overnight room temperature dry as is noted above for polyvinyl alcohol film. It appears that the required number of active groups for the essentially anhydride system is on the order of (1.03) for optimum results in the coating system. For the acid system, the optimum is on the order of (0.91), as a system utilizing about 14 parts acid has proven to be optimum for the normal coating system. At higher cross-linker levels the anhydride system still gives fair to good results due to bonding to the film surfaces while the acid system breaks down further. The difference in amounts of cross-linker needed is representative of that difference necessary for bonding to the polyvinyl alcohol film due to the reaction of anhydride with surface hydroxyl groups, a reaction which is negligible for acid type cross-linking. However, within relatively more narrow limits the acid may also provide a suitable coating in the nature of a laminated polyester film for some purposes where good but superior adhesion is not necessary.

EXAMPLE II

*Epoxidized Soybean Linseed Oil Mixture With 3,4,5,6,7,7-Hexachloro - 3,6 - Endomethylene-1,2,3,6-Tetrahydrophthalic Anhydride (HET) in Comparison With a Control Using the Corresponding Acid*

An epoxidized mixture of soybean oil and linseed oil having 6.7% oxirane oxygen was mixed with the amounts of anhydride and acid and cured in the same manner as Example I.

TABLE 2

| Code | Parts Epoxy Oil | Parts Anhydride | Parts Acid | Mole Ratio [1] | Comparative Adhesive Natue |
|---|---|---|---|---|---|
| A | 20 | 13 |  | 0.84 | P. |
| B | 20 | 15 |  | 0.97 | E. |
| C | 20 | 17 |  | 1.10 | E. |
| D | 20 | 20 |  | 1.29 | F. |
| E | 20 |  | 13 | 0.80 | G. |
| F | 20 |  | 15 | 0.92 | V.G. |
| G | 20 |  | 17 | 1.05 | P. |
| H | 20 |  | 20 | 1.23 | F. |

[1] See footnote—Table 1.

These results may be interpreted to agree with Example I in that higher levels are necessary for optimum results with anhydride (0.97–1.10) in comparison with the acid (0.92). This difference represents chemical bonding to the polyvinyl alcohol film in the anhydride case. Those materials gave slightly harder films than in Example I but with no discernable differences in adhesive nature for the corresponding optimum mixes. All of the mixes with the exception of A showed similar adhesive nature on glass with the film dried overnight at room temperature. However, in other properties, as hardness, the acid cure is superior on surfaces other than polyvinyl alcohol or surfaces which contain a minority of free hydroxyl groups.

EXAMPLE III

*Effect of Pre-Treatment of Polyvinyl Alcohol Film Prior to Coating*

Epoxidized soybean oil having 6.3% oxirane oxygen was mixed with a 50% solution of 3,4,5,6,7,7-hexachloro-3,6 - endomethylene - 1,2,3,6-tetrahydrophthalic anhydride (HET) to give 75 parts anhydride per 100 parts oil and a solids content of 70%. This mixture was used to coat 5 mil polyvinyl alcohol film sample of which one was pretreated by drying 20 minutes at 200° F. before coating (1.5 mil drawdown). The other sample was used as is. Both were coated and dried at 200° F. for 20 minutes. The dried PVA showed a slightly tacky film after curing while the non-treated PVA was dry. After aging overnight the coating laid down on the pre-dried polyvinyl alcohol showed a very slight superiority over that laid down on non-pretreated polyvinyl alcohol. Both films were excellent and surpassed similar films prepared using 75 parts acid to 100 parts oil. Similar systems utilizing an epoxidized soybean-linseed oil mixture (6.7% oxirane) gave similar results.

EXAMPLE IV

*Water Impermeability*

Polyvinyl alcohol films (5 mil) sprayed with a mixture of HET anhydride (15 parts) methyl isobutyl ketone (65 parts) and epoxidized soybean oil (6.3% oxirane—20 parts) were cured at 250° F. for 20 minutes. Water resistance was checked by attaching the film specimen to the bottom of a 4 oz. bottle containing a small amount of water, inverting, and placing in a beaker. The same was done using a control of uncoated polyvinyl alcohol. The uncoated control leaked immediately while no leaking was noted at the end of one week for the coated sample. Similar results were obtained using an impure grade of HET anhydride containing respectively 5% and 10% monochlorobenzene as impurities.

EXAMPLE V

*Moisture Vapor Transmission Rates of Coated Polyvinyl Alcohol Film*

Sheets of polyvinyl alcohol film (Dupont "Elvanol"), 18 in. x 5", were spray coated with a mixture of 50% HET anhydride in methyl isobutyl ketone (60 parts) epoxidized soybean oil (percent oxirane oxygen=6.3%—40 parts) and methyl isobutyl ketone (100 parts), and baked in an oven at 200° F. for 20 minutes. Samples were also coated on both sides with coating thicknesses of about ½ mil for one side coatings and one to two mils for two side coatings. Moisture vapor transmission was determined by two accepted procedures from ASTM E 96–53T. Procedure "A" is for use when materials to be tested are employed in a low range of humidities; Procedure "B" is for use on materials employed in the high range of humidities. In Procedure "A" the relative humidity of the faces of the film was 0% and 50% and the temperature 72° F. Calcium chloride was used as the desiccant in the Thwing vapometer to accept the moisture. In Procedure "B" the relative humidities of the film faces were 50% and 100% at 72° F. Water was used to provide 100% humidity inside the Thwing vapometer. In both procedures air was circulated rapidly over the outer surface as described in the ASTM method. These data are average values for at least three determinations.

TABLE 3

[Moisture vapor transmission of PVA film]

| Sample | Thickness, Mils | G./S. Meter/ 24 Hrs. | G./100 Sq. In./ 24 Hrs. | G./100 Sq. In./ 24 hrs./ Mil Thickness [1] |
| --- | --- | --- | --- | --- |
| Procedure "A": | | | | |
| Uncoated film | 3 | 7 | 0.45 | 1.4 |
| Film coated— | | | | |
| one side | 3.5 | 1.2 | 0.08 | 0.3 |
| two sides | 5 | 1.3 | 0.09 | 0.4 |
| Procedure "B": | | | | |
| Uncoated film | 3 | 147 | 9.5 | 29 |
| Film coated— | | | | |
| one side | 3.5 | 51 | 3.3 | 12 |
| two sides | 5 | 15 | 1.0 | 5 |

[1] Assuming MVT is inversely proportional to film thickness.

These values show the marked superiority of the coated film over that of the uncoated film.

EXAMPLE VI

The purity of anhydride, as mentioned throughout this application, is not necessarily of a high order, with acceptable results having been achieved with a mixture of 50/50 HET anhydride/HET acid. As little as 25% anhydride is acceptable but preferably in the order of 50% or better gives superior adhesive films. With some solvent systems, it is preferable to use anhydride containing large amounts of acid as this example shows a convenient two package system of liquids which may be readily mixed to give the final coating in an uncured state. In all cases, with the solvents mentioned it is possible to mix the pure anhydrides, oil and solvent in a Waring Blendor, ball mill or to use stirring with heat to achieve solutions which remain clear at temperatures to the solidification point of the mixture less than 0° F. In general, with most solvent blends it is possible to use pure anhydride and solvent and achieve solution which may, then or at a later date, be added to the epoxidized oil to achieve the coating mixture in an uncured state. However, it is noted that with some composite solvent blends a phenomenon exists wherein neither pure anhydride nor pure acid will remain in solution when chilled, yet a mixture of anhydride and acid remain indefinitely stable, that is, will not crystallize out. The following table illustrates this point. In all cases mixtures of the materials to achieve 75 parts curing agent per hundred parts of the epoxidized glyceride oil gave superior polyester coatings on polyvinyl alcohol films except in instances where no strong anhydride was used.

| | Parts Anhydride | Parts Acid | Parts Solvent | Solubility |
| --- | --- | --- | --- | --- |
| A | 0 | 200 | 125.5 Cellosolve Acetate, 125.5 Xylene. | poor. |
| B | 100 | 100 | | complete. |
| C | 200 | 0 | | poor. |
| D | 0 | 200 | 125.5 ethylene glycol diethyl ether, 125.5 xylene. | complete. |
| E | 100 | 100 | | complete. |
| F | 200 | 0 | | poor. |

Although the above is illustrative of the type of solubility relationships which exist, the non-solubility, at this level of solvent, in no way restricts the system as excellent polyvinyl alcohol film coatings are achieved with C and F and complete solution is achieved when 169 parts of either mixture is added to 100 parts epoxidized soybean oil (6.3% oxirane) and mixed vigorously. B and E give similarly excellent coating films by simply blending at the same level, coating and curing as in previous examples. A and D gives inferior films in adhesive nature due to the lack of anhydride. This example in no way restricts the use of solvent systems per se but is meant to show an interesting phenomenon, which was unexpected in preparing solutions at this level. The poor classification on the table does not mean that a complete state of insolubility was noted, but rather that not all of the material entered into solution or that limited degrees of crystallization was noted.

Having described the present embodiment of my invention in the art in accordance with the patent statues, it will be apparent that some modifications and variations as hereinto set forth may be made without departing from the spirit and scope thereof. The specific embodiments described are given by way of examples illustrative of the improvement which is to be limited only by the terms of the appended claims.

I claim:

1. A water permeable flexible polyvinyl alcohol film material provided with a substantially water-vapor impermeable polyester coating material derived from an epoxide fatty ester containing a plurality of oxirane and hydroxy groups.

2. A water permeable polyvinyl alcohol material provided with a substantially water and water-vapor impermeable organic polyester coating derived from epoxide esters of long chain fatty acids and chemically and intermolecularly bonded through a plurality of oxygen linkages to the said polyvinyl alcohol material.

3. A laminated structure comprising a relatively flexible water permeable polyvinyl alcohol sheet material provided with a substantially water impermeable flexible polyester coating, said coating comprising the reaction product of an epoxide long chain fatty ester containing a plurality of hydroxy and oxirane groups and a polycarboxylic acid material of a molecular weight of at least 180 and a pH of about 2 to 5.

4. The product of claim 3 wherein, the flexible polyvinyl alcohol film and the polyester formed coating comprises a reaction product of a polycarboxylic acid anhydride with an epoxide soybean oil material and is intermolecularly bonded to said polyvinyl alcohol.

5. The product of claim 3 wherein, the flexible polyvinyl alcohol film and the polyester formed coating comprises a reaction product of a polycarboxylic acid with an epoxide linseed oil material and is intermolecularly bonded to said polyvinyl alcohol film.

6. The product of claim 3 wherein, the flexible polyvinyl alcohol film and the polyester formed coating comprises a reaction product of a polycarboxylic acid with a mixture of epoxy soybean oil material and epoxy linseed oil material and is intermolecularly bonded to said polyvinyl alcohol film.

7. A water vapor resistant flexible film structure comprising a flexible polyvinyl alcohol sheet material and a film forming water and water vapor impermeable polyester formed coating thereover, said coating being derived from an epoxide fatty ester having an unsaturated fatty chain of 12–26 carbon atoms and an iodine value of at least 90 prior to epoxidation, said fatty oil material being directly bonded to said hydrophilic plastic sheeting by an in-situ curing with a mixture of a polybasic anhydride and a polybasic acid, each having a molecular weight of at least 180.

8. A laminated sheet material comprising a flexible base sheet of polyvinyl alcohol material constituting at least one lamina and a polyester formed film another lamina intermolecularly bonded thereto through oxygen linkages and derived from an epoxide fatty ester containing 12–26 carbon atoms and an oxirane value of at least about 6% in the fatty chain and a di-carboxylic acid material.

9. The method of waterproofing a vinyl alcohol flexible sheet material comprising the steps of mixing epoxide esters of long chain fatty acids of over 6% oxirane value in fatty chains of 12–26 carbon atoms with a strong polycarboxylic acid material having a molecular weight over 180 and a pH value of from 2 to 5 in aqueous solution, coating the mixture onto the said sheet material, heating the said coated sheet material, and effecting an in-situ intermolecular bonding of the said ester of fatty acid material to said flexible sheet material.

10. The method of providing a flexible polyvinyl alcohol sheet material with a waterproofing flexible polyester forming coating film, the steps comprising preparing a mixture of a film forming epoxide ester of a long chain fatty acid containing 12–26 carbon atoms in the fatty chain portion which had an iodine value of over 90 before epoxidation and an oxirane value of leastt about 6% after epoxidation, and a strong polycarboxylic acid material in an amount of at least 25% by weight of the epoxide ester of fatty acid material, coating the said sheet material with a film of said mixture, and effecting a curing of said film with chemical and intermolecular bonding of the polyvinyl molecules with the said epoxide and said acid material.

11. In the method of rendering a water permeable relatively flexible wrapping and packaging sheet material having hydroxyl groups essentially waterproof and water-vapor resistant the steps comprising preparing a fluid coating mixturre of a flexible film forming epoxide of a long chain fatty ester having internal oxirane groups in acyl chains of 12–26 carbon atoms which had an iodine value of at least 90 before epoxidation and a polycarboxylic acid material having a pH value of about 2 to 5, coating the said film forming mixture of said epoxidized fatty ester and said acid material to a said flexible base material, heating and effecting an in-situ formation of a dry flexible polyester film intermolecularly bonded to the said flexible sheet material.

12. In the method of claim 11, the step of providing said epoxide fatty ester coating mixture with an equivalent of a polycarboxylic acid anhydride in a mole ratio on the order of 0.91 to on the order of 1.10 relative to the molar rate of said epoxy fatty ester.

13. In the method of claim 11, the step of providing said epoxidized fatty ester coating mixture with a mixture of polycarboxylic anhydride and polycarboxylic acid materials.

14. The method of claim 13 wherein, the said anhydride is present in a ratio of at least about 25% of said anhydride and acid materials mixture.

15. A waterproofing coating composition for coating hydrophilic film material comprising a mixture of an epoxide polyhydric ester of a long chain fatty acid and containing an acyl group of 12–26 carbon atoms having an iodine value of at least 90 prior to epoxidation, and a mixture of polycarboxylic acid and polycarboxylic acid anhydride materials, each of said anhydride and acid materials having a molecular weight of at least 180 and in combination a pH value no higher than about 4.7 in 1% and higher concentration in water.

References Cited in the file of this patent

UNITED STATES PATENTS

| | | |
|---|---|---|
| 2,436,433 | Jebens | Feb. 24, 1948 |
| 2,682,515 | Naps | June 29, 1954 |
| 2,754,307 | Hempel et al | July 10, 1956 |
| 2,801,253 | Greenspun et al. | July 30, 1957 |

UNITED STATES PATENT OFFICE
CERTIFICATE OF CORRECTION

Patent No. 3,043,717                                        July 10, 1962

Walter M. Budde, Jr.

It is hereby certified that error appears in the above numbered patent requiring correction and that the said Letters Patent should read as corrected below.

In the grant, lines 2 and 3, for "assignor to Archer-Daniels-Midland Company, of Hennepin County, Minnesota, a corporation of Delaware," read -- assignor to Archer-Daniels-Midland Company, of Minneapolis, Minnesota, a corporation of Delaware, --; in the heading to the printed specification, lines 4 to 6, for "assignor to Archer-Daniels-Midland Company, Hennepin County, Minn., a corporation of Delaware" read -- assignor to Archer-Daniels-Midland Company, Minneapolis, Minn., a corporation of Delaware --; column 1, line 18, for "(or oxirane compounds)" read -- (or oxirane) compounds --; line 19, for "epoxiding" read -- epoxidizing --; column 2, line 2, for "faty" read -- fatty --; column 4, line 63, for "or", second occurrence, read -- of --; column 5, line 13, for "aceton" read -- acetone --.

Signed and sealed this 4th day of December 1962.

(SEAL)
Attest:

ERNEST W. SWIDER                                              DAVID L. LADD

Attesting Officer                                              Commissioner of Patents